United States Patent [19]

Stocking

[11] 4,161,319
[45] Jul. 17, 1979

[54] EXPANSION PACKER

[76] Inventor: Arnold G. Stocking, 1132 Marcombe Crescent NE., Calgary, Alberta, Canada

[21] Appl. No.: 923,179

[22] Filed: Jul. 10, 1978

[30] Foreign Application Priority Data

Jul. 14, 1977 [CA] Canada ................................. 282701

[51] Int. Cl.² ..................... F16J 15/10; E21B 33/128
[52] U.S. Cl. ................................. 277/116.6; 277/125; 277/188 R; 166/122; 166/134; 166/196
[58] Field of Search .................. 277/102, 116.4, 116.6, 277/116.8, 120–125, 186, 188 R, 188 A, 190, 193, 199, 228; 166/120, 122, 194, 196, 134, 191

[56] References Cited

U.S. PATENT DOCUMENTS

| | | | |
|---|---|---|---|
| 1,502,372 | 7/1924 | Callanan | 277/116.8 |
| 1,975,390 | 10/1934 | Davis | 277/116.4 |
| 2,136,597 | 11/1938 | Spang | 277/116.4 X |
| 2,217,986 | 10/1940 | Knox | 277/116.6 X |
| 3,215,205 | 11/1965 | Sizer | 166/120 |
| 3,469,854 | 9/1969 | Linwood | 277/125 X |
| 3,554,280 | 1/1971 | Tucker | 166/134 |
| 3,559,733 | 2/1971 | Kilgore | 166/134 |

*Primary Examiner*—Robert S. Ward, Jr.
*Attorney, Agent, or Firm*—Stanley G. Ade

[57] ABSTRACT

The conventional expansion packer includes upper and lower elements joined to a central element with the junctions being perpendicular to the longitudinal axis and with the upper and lower elements being formed of a resilient material such as rubber, having a higher durometer reading than the center section which is also made of a resilient material such as rubber. When compressed lengthwise to pack off a well drilling, severe strain occurs at the junctions of the center section and the end sections often causing tearing or fracturing. The present device is provided with junctions between the outer and center sections which taper or incline outwardly and towards the transverse axis of the center section. Furthermore, cylindrical flexible webs span the junctions axially and formed from a flexible material such as canvas or the like to preserve the integrity of the bonding between the sections.

4 Claims, 4 Drawing Figures

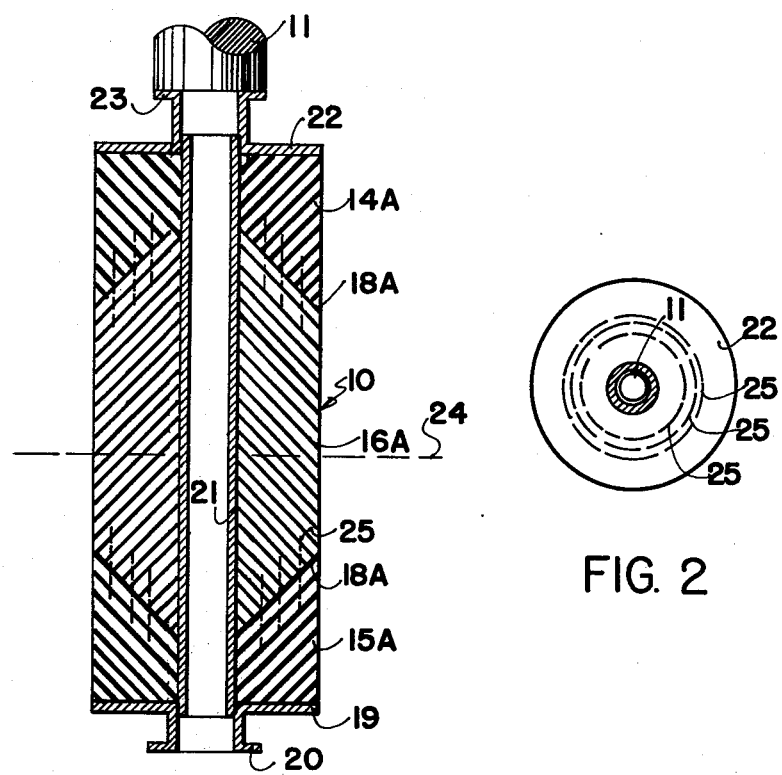
FIG. 1
FIG. 2
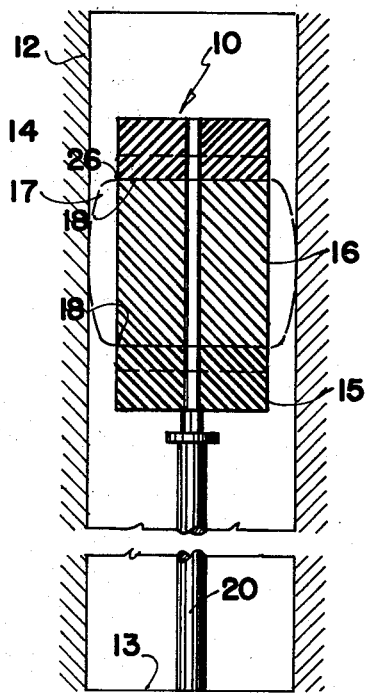
FIG. 3
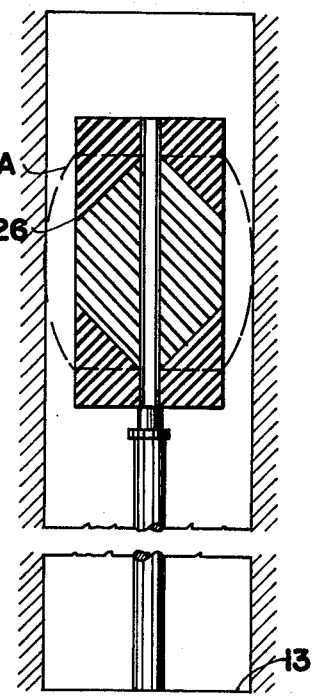
FIG. 4

EXPANSION PACKER

BACKGROUND OF THE INVENTION

The invention relates to new and useful improvements in expansion packers used in oil well drillings.

Expansion packers are used in test equipment which is secured to the lower end of a drill string and lowered down the well once it has been drilled as far as the oil or gas zone. These packers form part of the testing equipment and are used to shut off zones above oil or gas locations in order to stop contamination by water and the like while testing is taking place.

The drill string connects to the top plate of the packer and when the bottom of the drilling is reached, extra downward pressure on the string moves the top plate downwardly on the mandrel and expands the rubber packer outwardly to the walls of the drill hole thereby closing off the hole.

The mandrel maintains the integrity of the connection through the packer for sampling procedures, etc.

Conventionally, the packing elements are formed of upper and lower sections and a center section bonded together with the junctions being substantially perpendicular to the longitudinal axis of the packer and the upper and lower sections are usually of a higher durometer reading than the center section so that compression of the packer causes the center section to bulge outwardly. However, the junctions often break away or tear, destroying the effectiveness of the packer and it will be appreciated that considerable time and effort is wasted if the drill string has to be removed in order to replace a packer.

SUMMARY OF THE INVENTION

The present invention overcomes these disadvantages by providing a packer in which the integrity of the junctions between the upper and lower portions, is preserved and one aspect of the invention consists of an expansion packer for oil well drillings comprising in combination a mandrel having upper and lower connections and a central axially extending tubular portion therebetween, a resilient packing element surrounding said tubular portion and extending between said upper and lower connections, said packing element including upper and lower tubular sections and a center section, all formed from a resilient elastomeric material, bonded junctions between each of said upper and lower sections and the respective ends of said center section, the durometer reading of said upper and lower sections being greater than the durometer reading of said center section, said junctions inclining at an angle and extending outwardly from said tubular portion of said mandrel and towards the transverse axis of said center section thereby forming a substantial conical junction.

A further aspect of the invention consists of a device which may include flexible reinforcing means spanning the junctions between the upper, lower and center sections in order to assist in preserving the integrity of the packer.

An object of the invention is to provide a device of the character herewithin described which also provides a better expansion profile to the packer than is usual with the conventional packer.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a longitudinal cross sectional side elevation of the invention.

FIG. 2 is a top view of FIG. 1.

FIG. 3 is a schematic view showing a conventional packer and the expansion profile in phantom.

FIG. 4 is a view similar to FIG. 3, but showing the expansion profile of the present invention.

In the drawings like characters of reference indicate corresponding parts in the different figures.

DETAILED DESCRIPTION

Proceeding therefore to describe the invention in detail, reference character 10 generally illustrates the expansion packer connected to the bottom end of a drill string 11 by conventional means (not illustrated) and normally engaging down a well bore 12 which has been drilled to the lower end location 13.

Dealing first with FIG. 3, a conventional packer includes upper and lower portions 14 and 15 bonded to a center section or portion 16, all portions being made an elastomeric material such as rubber or the like with the upper and lower portions 14 and 15 having a higher durometer reading than the center section 16.

When downward pressure is placed upon the upper end of the packer, the center section expands along the profile indicated by reference character 17 and shown in phantom in FIG. 3 so that considerable strain exists at the bonding junctions 18 between the upper and lower sections and the center section which often causes tearing or breakage to occur at these points. Furthermore, the expansion profile indicated by reference character 17 is not the best profile for efficient sealing relationship between the packer 10 and the walls of the drill hole 12.

Dealing next with the present invention, it comprises upper and lower portions or sections 14A and 15A respectively, together with a center section 16A, all formed from a resilient elastomeric material and with the upper and lower sections 14A and 15A having a higher durometer reading than the center section 16A.

The lower section 15A rests on a lower cylindrical plate 19 having a connector portion 20 secured thereto to which conventional testing equipment indicated schematically by reference character 20, is connected and engages the bottom 13 of the drill hole when in position.

A cylindrical mandrel 21 extends upwardly from the bottom plate 19 and is engaged slidably by a top circular plate 22 which in turn is connected to the base of an upper connector 23 to which the aforementioned drill string 11 is connected conventionally (not illustrated).

The bonded junctions 18A between the upper and lower sections 14A and 15A and the center section 16A, are cone-shaped inasmuch as they incline outwardly from the mandrel 21 and towards the transverse axis 24 of the packer.

It is desirable that flexible reinforcing means also be provided across the bond lines 18A in order to reinforce this junction and in the preferred embodiment, one or more cylindrical elements 25 of flexible material such as canvas or the like, are embedded within the elastomeric material and span the junctions between the upper portion or section 14A and the center section, and between the lower portion or section 15A and the center section. If more than one reinforcing cylindrical element is used, then these can be placed concentrically one with the other as shown.

When the tester is secured to the bottom end of the drill string with the testing equipment 20 therebelow, it is lowered into the drill hole until the testing equipment engages the lower end 13 of the drill hole whereupon further downward pressure causes the upper plate 22 and the connector 23 to slide down the mandrel 21 thus expanding the elastomeric elements until they engage the side wall of the hole and pack off the hole at this point and the dotted lines 17A in FIG. 4 show the profile formed by this improved tester which gives a more gradual slope than the conventional tester and therefore a better seal.

Also, because of the angle at which the junctions 18A are situated, the thinner wall area of the higher durometer material, as it approaches the outer wall of the tester, permits this improved profile to be formed and removes the point of strain from the outer junction periphery 26 thus taking the strain away from this point.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An expansion packer for oil well drillings comprising in combination a mandrel having upper and lower connections and a central axially extending tubular portion therebetween, a resilient packing element surrounding said tubular portion and extending between said upper and lower connections, said packing element including upper and lower tubular sections and a center section, all formed from a resilient elastomeric material, bonded junctions between each of said upper and lower sections and the respective ends of said center section, the durometer reading of said upper and lower sections being greater than the durometer reading of said center section, said junctions inclining at an angle and extending outwardly from said tubular portion of said mandrel and towards the transverse axis of said center section thereby forming a substantial conical junction.

2. The packer according to claim 1 which includes flexible reinforcing means spanning said junctions.

3. The packer according to claim 2 in which said flexible reinforcing means comprises at least one cylinder of flexible reinforcing material embedded in said packing element and extending from each of said upper and lower sections respectively and into said center section and being situated conecentrically with the longitudinal axis of said element.

4. The packer according to claim 3 which includes a plurality of cylindrical reinforcing material of varying diameters in coaxial relationship one with another.

* * * * *